J. E. HARVEY.
AUTOMATIC CONTROLLING MEANS FOR ELECTRIC HEATERS.
APPLICATION FILED DEC. 16, 1915.
1,235,796.
Patented Aug. 7, 1917.
2 SHEETS—SHEET 1.
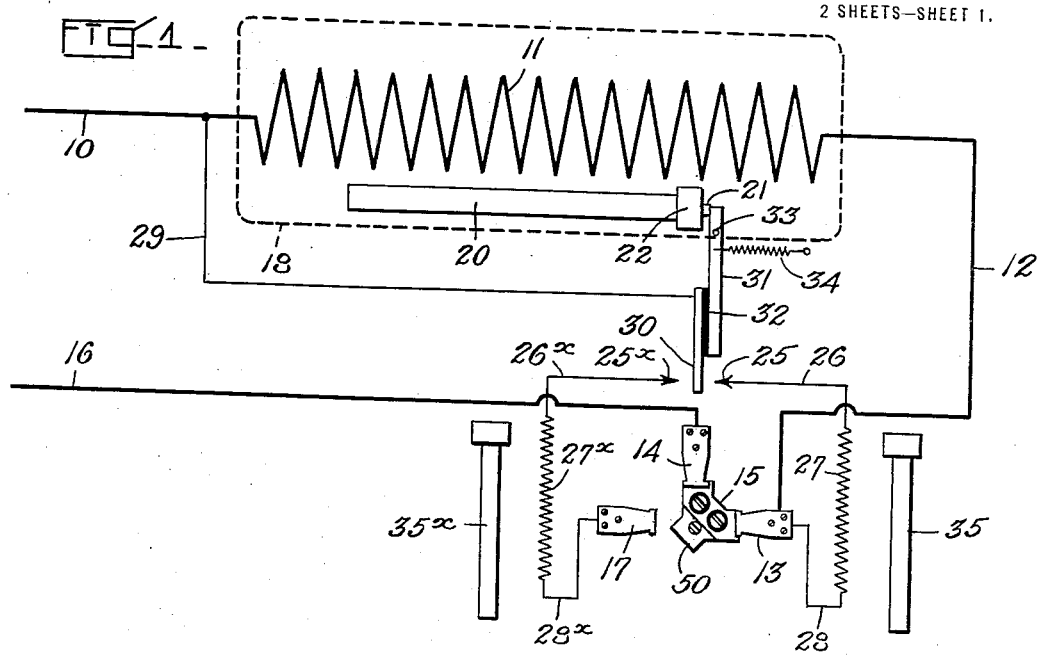
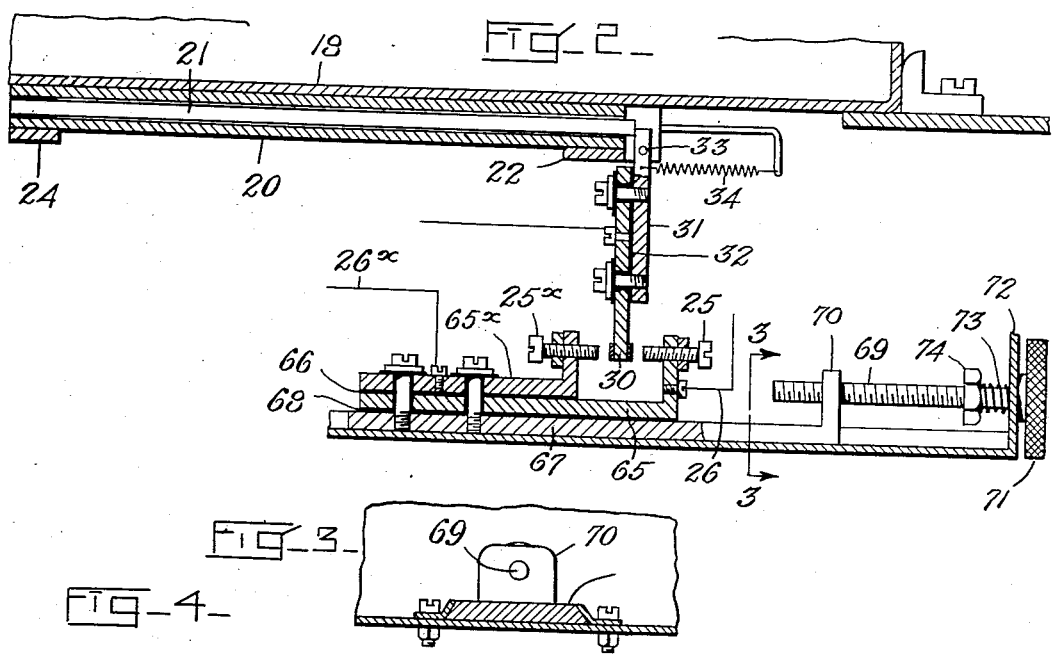
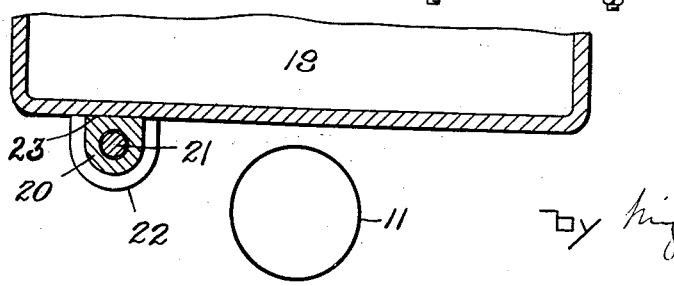
INVENTOR:
J. E. HARVEY J. E. HARVEY.
AUTOMATIC CONTROLLING MEANS FOR ELECTRIC HEATERS.
APPLICATION FILED DEC. 16, 1915.
1,235,796.
Patented Aug. 7, 1917.
2 SHEETS—SHEET 2.
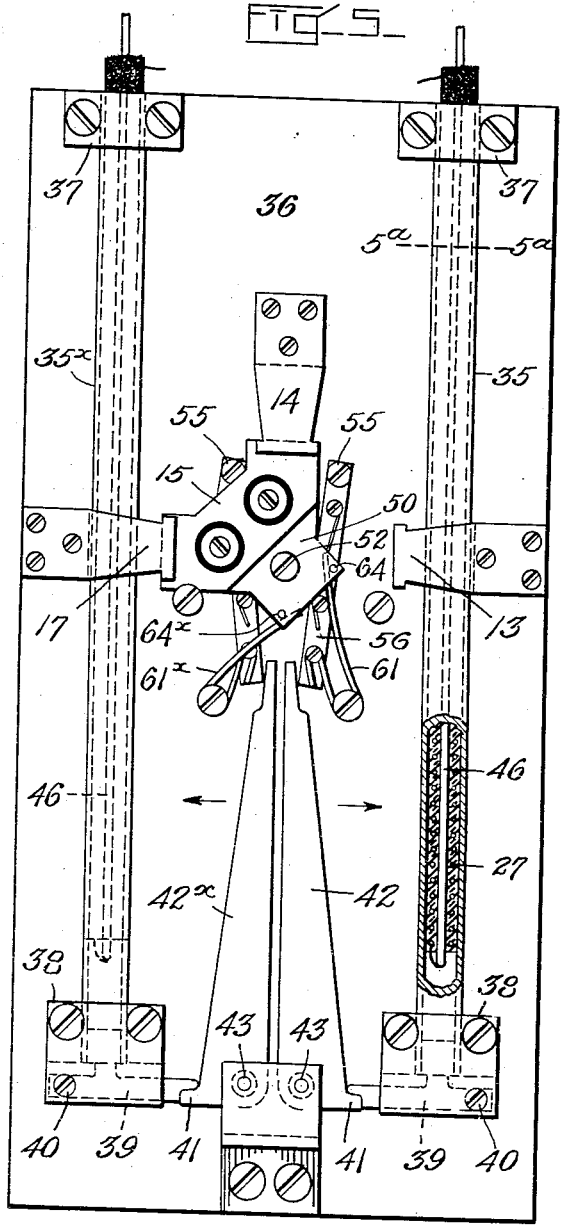
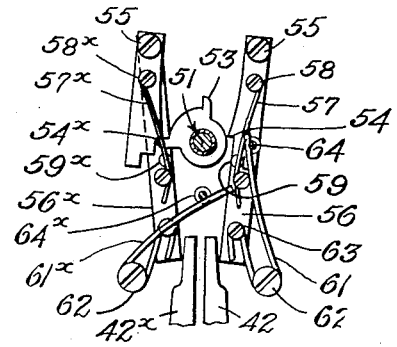
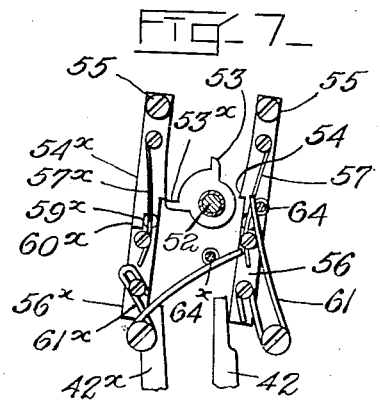
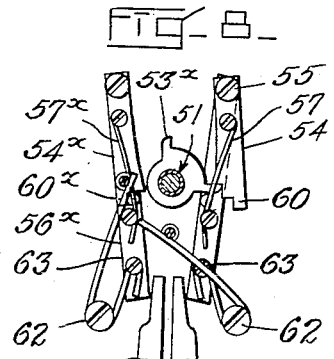
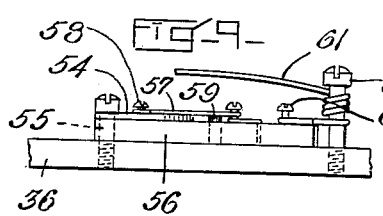
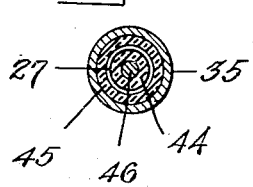
INVENTOR:
J. E. HARVEY
ATTORNEYS

UNITED STATES PATENT OFFICE.

JOHN E. HARVEY, OF MILTON, MASSACHUSETTS.

AUTOMATIC CONTROLLING MEANS FOR ELECTRIC HEATERS.

1,235,796.  Specification of Letters Patent.  Patented Aug. 7, 1917.

Application filed December 16, 1915. Serial No. 67,122.

*To all whom it may concern:*

Be it known that I, JOHN E. HARVEY, a citizen of the United States, residing at Milton, in the county of Norfolk and State of Massachusetts, have invented new and useful Improvements in Automatic Controlling Means for Electric Heaters, of which the following is a specification.

This invention relates to automatic means for controlling electric heaters, and the object is to provide thermo-responsive means for opening and closing an electric circuit through the heating element, to the end that the temperature of the heated element will be maintained within predetermined limits for an indefinite period.

The circuit which includes the main heating coil includes also a circuit-controlling switch. This switch is actuated by two thermo-dynamic devices alternately, to open and close the main circuit. These thermo-dynamic devices are hereinafter termed the secondary thermo-dynamic devices to distinguish them from a primary thermo-dynamic device. The two secondary thermo-dynamic devices are influenced by two secondary heating coils respectively, but are not influenced to any appreciable extent by the main heating coil. The two secondary coils are connected alternately with a source of electricity by a two-way switch hereinafter termed the "pilot" switch to distinguish it from the switch which controls the main circuit. The pilot switch is actuated by a primary thermo-dynamic device under the influence of the heated element and is preferably attached to the latter so that it will be heated coextensively with it by the main heating coil. When the temperature of the heated element reaches a predetermined degree for which the apparatus is adjusted, the primary thermo-dynamic device closes a circuit by means of the pilot switch through the secondary coil which causes the circuit through the main heating coil to be opened, and as the heated element and primary thermo-dynamic device grow cooler the latter causes the pilot switch to close the circuit through the other secondary heating coil, whereby the main switch is actuated to close the circuit through the main heating coil. The primary thermo-dynamic device thus operates to close controlling circuits through the two secondary heating coils alternately, to open and close the circuit through the main heating coil, and such operations may occur an indefinite number of times so long as current is supplied.

For the sake of avoiding undue waste of current through the controlling circuits, a switch of the two-way type is utilized as the main switch, and the two controlling circuits are connected respectively to the two way-terminals thereof, in consequence of which each secondary coil is cut out automatically as soon as its work has been accomplished. Each controlling circuit is thus closed by the pilot switch and opened by the main switch.

Of the accompanying drawings, which illustrate one form and arrangement in which the invention may be embodied:

Figure 1 represents a wiring diagram according to which the main switch is in position to close the circuit through the main heating coil.

Fig. 2 represents a sectional view including the primary thermo-dynamic device and the pilot switch.

Fig. 3 represents a section through the structure intersected by line 3—3 of Fig. 2.

Fig. 4 represents a vertical cross section through the lower portion of a utensil to be heated, the primary thermo-dynamic device being fastened to the bottom of such utensil so as to undergo thermal variations coextensive with those of the utensil.

Fig. 5 represents a top plan view of a main switch of the snap style suitable for the purposes of the present invention. This figure includes also the two secondary thermo-dynamic devices by which the main switch is operated. In this figure the main switch is in open position with reference to the circuit through the main heating coil.

Fig. 5$^a$ represents a section through one of the secondary thermo-dynamic devices as indicated by line 5$^a$—5$^a$ of Fig. 5.

Fig. 6 represents a horizontal section in a plane below the conductor of the main switch but above the operating mechanism, the position of the parts being the same as in Fig. 5.

Fig. 7 represents a view similar to Fig. 6 showing the operating mechanism in the act of throwing the main switch from the position shown by Fig. 5 to that shown by Fig. 1, and although the switch is released so that it may move, its angular position is the same as in Figs. 5 and 6.

Fig. 8 represents a view similar to Fig. 6, excepting that the angular position of the switch is the same as that shown by Fig. 1.

Fig. 9 represents an elevation of one of the tripping devices of the main switch.

The same reference characters indicate the same parts wherever they occur.

The drawings are conventional in some respects, for the sake of simplicity, and it is to be understood that the scope of the invention is not limited to the arrangement and relation of the elements as shown, excepting as may be hereinafter specified in the claims.

The main circuit is represented by relatively heavy lines, and includes conductor 10, main heating coil 11, conductor 12, switch terminal 13, switch terminal 14, switch 15, and conductor 16. The main switch is of the two-way type and includes a terminal 17. As shown by Fig. 1 the terminals 13 and 14 are connected by the switch 15, the main circuit being thus closed through the main heating coil. When the switch 15 is in its other position, as shown by Fig. 5, it connects the terminals 14 and 17, but is out of contact with the terminal 13, and in such position the main circuit would be open. The terminals 13 and 17 are hereinafter termed the "way-terminals" to distinguish them from the terminal 14 which is common to both.

The outline of a utensil to be heated by the main coil 11 is indicated by dotted lines 18. This representation of the utensil may be regarded as a top plan view. A thermo-dynamic device is fastened to the bottom of the utensil 18. See Fig. 4. This device, hereinafter termed the primary thermo-dynamic device, undergoes expansion and contraction according to the increase and decrease of temperature of the utensil 18. The structure of the primary thermo-dynamic device is capable of variation within the scope of the present invention, but I have shown a structure specially designed for the purpose. As shown by the drawings, this device includes a tube 20 and a rod 21 arranged therein. The elements 20 and 21 are made of different kinds of metal which expand and contract unequally, the tube being made preferably of brass and having relatively great range of expansion, and the rod being made preferably of steel and having relatively slight expansion. As shown by Figs. 1 and 2, the right-hand end of the tube 20 is brazed or otherwise anchored in a block or other fixture 22, and the latter is brazed or otherwise affixed to the bottom of the utensil 18. The tube as shown has a flat longitudinal face 23 (Fig. 4) and this face lies in contact with the bottom of the utensil. The left-hand end of the tube, with reference to Figs. 1 and 2, has sliding engagement with a guiding piece 24, the latter being affixed to the bottom of the utensil. In consequence of so mounting the tube the left-hand end of the latter will move to the left or to the right according to whether the temperature of the utensil is increasing or decreasing. The left-hand end of the rod 21 is brazed or otherwise affixed to the left-hand end of the tube, and the right-hand end of the rod projects beyond the right-hand end of the tube sufficiently to operate the pilot switch hereinafter described. Inasmuch as the expansive and contractive action of the rod is relatively slight it may be disregarded. It will be sufficient to state that the rod will move to the left as the temperature of the utensil increases, and to the right as the temperature decreases.

The action of the primary thermo-dynamic device is utilized to actuate a pilot switch for closing two controlling circuits alternately. One controlling circuit includes terminal 25, conductor 26, secondary heating coil 27, conductor 28, and way-terminal 13 of the main switch. The other controlling circuit includes terminal 25$^x$, conductor 26$^x$, secondary heating coil 27$^x$, conductor 28$^x$, and way-terminal 17 of the main switch. According to the wiring shown, the two said controlling circuits are branches of a shunt circuit of the main circuit. Such shunt circuit includes conductor 29 and contact piece 30, the latter being the principal element of the pilot switch hereinbefore mentioned. The contact piece 30, as shown, is carried by a lever 31 and insulated from the latter by insulating material 32. 33 indicates the pivot pin of the lever 31. A tension spring 34 is connected to lever 31 and tends to move the contact piece 30 toward the terminal 25. The upper end of the lever 31 is kept against the rod 21 by the spring 34.

When the temperature of the utensil 18 has increased to the degree for which the apparatus is adjusted, the pilot switch 30 closes the shunt circuit through the branch which includes the secondary heating coil 27; and although the main circuit is closed at such time, the following shunt circuit is closed: conductor 10, conductor 29, pilot switch 30, terminal 25, conductor 26, coil 27, conductor 28, terminal 13, switch 15, terminal 14, and conductor 16. The closing of such shunt circuit causes the coil 27 to heat a secondary thermo-dynamic device 35. The mechanical details of the device 35 are hereinafter described. At this time it will be sufficient to state that the expansive action of 35 is rapid and causes the main switch 15 to move from the position shown by Fig. 1 to that shown by Fig. 5. Such movement of the main switch opens the main circuit through the coil 11 and also opens the shunt circuit through the branch which includes the coil 27. It also makes electrical connection between contacts 14 and 17, so that the shunt circuit through the branch including coil 27× is closed, excepting at the point controlled by pilot switch 30.

Following the shifting of the main switch 15 as aforesaid, the primary thermo-dynamic device and the secondary device 35 contract, and when the primary device has contracted sufficiently to move the pilot switch 30 into engagement with terminal 25× the shunt circuit is closed through secondary coil 27×. This coil is arranged to influence secondary thermo-dynamic device 35×, the latter being a companion of device 35. Device 35× expands rapidly under the influence of coil 27× and in due time, as hereinafter explained, throws main switch 15 back to the position shown by Fig. 1. This operation opens the shunt circuit through coil 27×, closes the main circuit through coil 11, and closes the other branch of the shunt circuit between terminals 14 and 25.

The foregoing explanation covers a complete cycle of operations, and this cycle is automatically repeated an indefinite number of times so long as current is supplied, the primary thermo-dynamic device causing the two secondary thermo-dynamic devices to operate alternately. It is to be observed that each secondary coil is disconnected as soon as it has accomplished its work, and that waste of current is thus avoided.

Although the primary thermo-dynamic device appears in close relation to the primary coil 11 in Fig. 1, it is not intended that such device be heated directly by the coil. It is intended that the primary device receive its heat directly from the utensil 18, to the end that the controlling of the circuits shall be determined by the temperature of the utensil 18.

The two secondary thermo-dynamic devices are alike in the matter of structure and operation, and a description of one will suffice for both. These devices as shown by Fig. 5 are mounted upon a base 36, the main switch being also mounted upon this base. Each secondary device consists of a tube, preferably brass. One end of each tube is brazed or otherwise anchored to a block or other fixture 37, and the other end is arranged to slide in a guide block 38. The free ends of the tubes are arranged to engage levers 39 respectively. The fulcrum studs of these levers are indicated at 40. The free end of the right-hand lever 39 is arranged to bear against a finger 41 of a bell-crank lever 42, and in like manner the free end of the left-hand lever 39 is arranged to bear against a finger 41 of a bell-crank lever 42×. The fulcrum pins of the bell-crank levers are indicated at 43, 43. The expansive action of the devices 35 and 35× results in downward thrust against the levers 39, and such thrust results in movement of the bell-crank levers according to the arrows in Fig. 5, although it is to be remembered that the devices 35 and 35× never expand at the same time.

The secondary heating coils 27, 27× are contained respectively in the tubular devices 35, 35×, and their heating action is therefore utilized most effectively to cause rapid expansive action. As shown by Fig. 5ᵃ the coil is arranged between two concentric tubular layers 44, 45 of electric insulating material. A metal rod 46 is arranged in the inner layer 44 and serves the function of a core on which the insulating material and coil may be built up, and also as an electric conductor, one end of the coil being soldered or otherwise attached to the central rod.

The main switch 15 is made special for the purpose of the present invention, and the important thing concerning it is that it has a rapid snap movement in both directions. The mechanism for operating the switch is shown in three different positions by Figs. 6, 7 and 8. The conductor portion 15 is mounted upon but insulated from an oscillatory carrier 50. This carrier has a sleeve portion 51 arranged upon a pivot stud 52. It also has two shoulders 53, 53×. These shoulders are arranged to coact respectively with retaining pawls 54, 54×. These pawls are pivotally mounted upon pivot studs 55, 55. Operating arms are indicated at 56, 56× respectively. In the present instance these operating arms are pivotally mounted on the pivot studs 55, 55. Although it is convenient and desirable to use each pivot stud 55 as the common pivot member for an operating arm and for a retaining pawl, the device is not dependent upon such arrangement. Each operating arm is movable independently of its companion retaining pawl, notwithstanding both are arranged upon the same pivot member.

The retaining pawls are normally held in retaining position by leaf springs 57, 57×. In the present instance these springs are carried respectively by the operating arms, and the free ends of the springs bear against studs 58, 58× carried by the retaining pawls. The operating arms carry studs 59, 59× respectively, and these studs coact with portions 60, 60× of the retaining pawls respectively. For example, referring to Fig. 6, the switch is in position to be shifted by swinging the lower end of operating arm 56× to the left. Clockwise movement of the switch about pivot stud 52 is prevented by retaining pawl 54×, the latter standing in the way of shoulder 53×. However, as the lower end of arm 56× swings to the left, stud 59× will, in due course, engage portion 60× of the retaining pawl and displace the latter as shown by Fig. 7, thus removing the pawl from the path of the shoulder 53ˣ. Such movement of the operating arm prior to retraction of the retaining pawl is utilized to set up deflection in a normally relaxed operating spring, and such operating spring is utilized to cause the angular movement of the switch.

There are two normally relaxed operating springs 61, 61ˣ, and they operate alternately, one to throw the switch to one position, and the other to throw the switch to the other position. These springs are put under tension by the arms 56 and 56ˣ respectively. Each spring is loosely coiled about a stud 62, and one end is engaged by a stud 63 on the respective operating arm. The free ends of the springs bear against pins 64, 64ˣ respectively, said pins being carried by the carrier 50. The free ends of the operating arms are arranged to be engaged by the free ends of the bell-cranks 42, 42ˣ respectively.

Assuming, for example, that the switch is in the position shown by Fig. 5, and that the pilot switch 50 is caused to close the shunt circuit through coil 27ˣ in consequence thereof, the expansive action of device 35ˣ causes the bell-crank 42ˣ to move from the position shown by Figs. 5 and 6 to that shown by Fig. 7. The greater portion of such movement results in putting spring 61ˣ under tension tending to throw the switch 15, but the switch is held by retaining pawl 54ˣ until the latter has been retracted by pin 59ˣ to release the switch. When the release occurs the deflection of spring 61ˣ from normal relaxed condition is sufficient to throw the switch to the position shown by Fig. 1. As the switch moves to its new position the shoulder 53 displaces pawl 54 and the latter is returned to retaining position in front of the shoulder by its spring 57. The throwing of the main switch opens the shunt circuit, and the device 35ˣ is permitted to cool in consequence thereof. As the device 35ˣ contracts, the excess deflection of spring 61ˣ expends itself in returning operating arm 56ˣ and bell-crank 42ˣ to their initial positions, thus placing retaining pawl 54ˣ in position to catch the switch the next time the switch is moved to the position shown by Fig. 5. The next operation of the switch brings into operation bell-crank 42, operating arm 56, and the several auxiliary devices combined therewith, all of which operate substantially according to the operation described, the only difference being that the directions of motions are the reverse.

Although it has been stated that the springs 61, 61ˣ are normally relaxed, the qualification "relaxed" is used in its comparative sense. This is not intended to mean that it is relaxed to the last degree, but is intended to mean that each spring when in its normal or initial condition is relaxed to such extent that it will not have sufficient force to prevent complete movement of the switch under the influence of the other operating spring.

Figs. 2 and 3 include a device by which the timing of the controlling means may be varied with reference to the maximum and minimum temperatures of the heated element 18. As shown by Fig. 2 the terminals 25, 25ˣ are in the form of setscrews. These terminals are mounted in metallic base pieces 65, 65ˣ respectively, and said base pieces are electrically separated from each other by insulating material 66, but they are rigidly connected to each other and are rigidly mounted upon an adjustable slide or carrier 67. Base 65 is insulated from the carrier 67 by insulating material 68. An adjusting screw 69 coacts with an ear 70 of the carrier 67, said ear being bored and tapped for coaction with said screw. The screw as shown is provided with a head or knob 71 by which it may be rotated. The shank of this screw extends loosely through a fixture 72. A helical compression spring 73 is coiled about the shank of the screw and is compressed between the fixture 72 and a nut or collar 74 affixed to the screw. The spring keeps the screw and carrier pressed to the left as far as the head 71 will permit, and it maintains enough friction on the screw to prevent accidental turning of the latter.

According to the arrangement of elements as shown, terminal 25 determines the maximum temperature of the heated element 18, and terminal 25ˣ determines the minimum temperature. These terminals are capable of being adjusted toward and from each other, and such adjustment varies the range or degree of difference between the maximum and minimum temperatures of the heated element. When the screw 69 is turned it moves the terminals 25, 25ˣ in unison, thus raising or lowering the maximum and minimum temperatures coextensively. If it is desired to open the circuit through the main heating coil 11 when the temperature of the element 18 reaches two hundred degrees, for example, terminal 25 would be adjusted accordingly; and if it should be desired to close the circuit through the main heating coil when the temperature of the heated element drops to one hundred seventy-five degrees for example, terminal 25ˣ would be adjusted accordingly. This would give a range of variation of twenty-five degrees. Now if it should be desired to maintain the range of variation at twenty-five degrees but to open the main circuit when the temperature of the heated element is at two hundred ten degrees, the desired result would be obtained by turning the screw 69 to move slide 67 to the right. Inasmuch as this would move the terminal 25× coextensively with the movement of terminal 25, the circuit through the main heating coil would be closed when the temperature of the heated element drops to one hundred eighty-five degrees.

I claim:

1. In combination, a main electrical circuit including a main heating coil and a main switch, an element arranged to be heated by said coil and including a thermo-dynamic device, a two-way switch arranged to be actuated by said thermo-dynamic device, two controlling circuits each having a secondary heating coil, said two-way switch being arranged to close said controlling circuits one at a time, and two secondary thermo-dynamic devices arranged to be heated by said secondary coils respectively and arranged to act on said main switch, one of said secondary devices being arranged to open said main switch and the other being arranged to close the same.

2. In combination, a main electrical circuit including a main heating coil and a two-way main switch, an element arranged to be heated by said coil and including a thermo-dynamic device, a two-way pilot switch arranged to be actuated by said thermo-dynamic device, two controlling circuits each having a secondary heating coil, said pilot switch being arranged to close said controlling circuits one at a time, said controlling circuits being connected to the way-terminals respectively of said main switch to be opened alternately as the latter opens and closes the main circuit, and two secondary thermo-dynamic devices arranged to be heated by said secondary coils respectively and arranged to act on said main switch to open and close the main circuit respectively.

3. In combination, a main electrical circuit including a main heating coil and a two-way main switch, an element arranged to be heated by said coil and including a thermo-dynamic device, a shunt circuit arranged to short circuit said coil, said shunt circuit including two branches and a two-way pilot switch arranged to close said shunt circuit through said branches one at a time, said pilot switch being arranged to be actuated by said thermo-dynamic device, said branches being connected respectively to the two-way terminals of said main switch, each of said branches including a secondary heating coil, and two secondary thermo-dynamic devices arranged to be heated by said secondary coils respectively, said secondary devices being arranged to actuate said main switch alternately to open and close said main circuit respectively.

4. In combination, a main electrical circuit including a main heating coil and a main switch, an element arranged to be heated by said coil and including a thermo-dynamic device, a two-way switch arranged to be actuated by said thermo-dynamic device, two controlling circuits each having a secondary heating coil, said two-way switch being arranged to close said controlling circuits one at a time, two secondary thermo-dynamic devices arranged to be heated by said secondary coils respectively and arranged to act on said main switch, one of said secondary devices being arranged to open said main switch and the other being arranged to close the same, the way-terminals of said two-way switch being adjustable relatively to each other to vary the amplitude of thermal range of control of the first said device, and means adapted to adjust said way-terminals in unison to shift such range and maintain a predetermined amplitude thereof.

In testimony whereof I have affixed my signature.

JOHN E. HARVEY.